United States Patent Office 3,393,831
Patented July 23, 1968

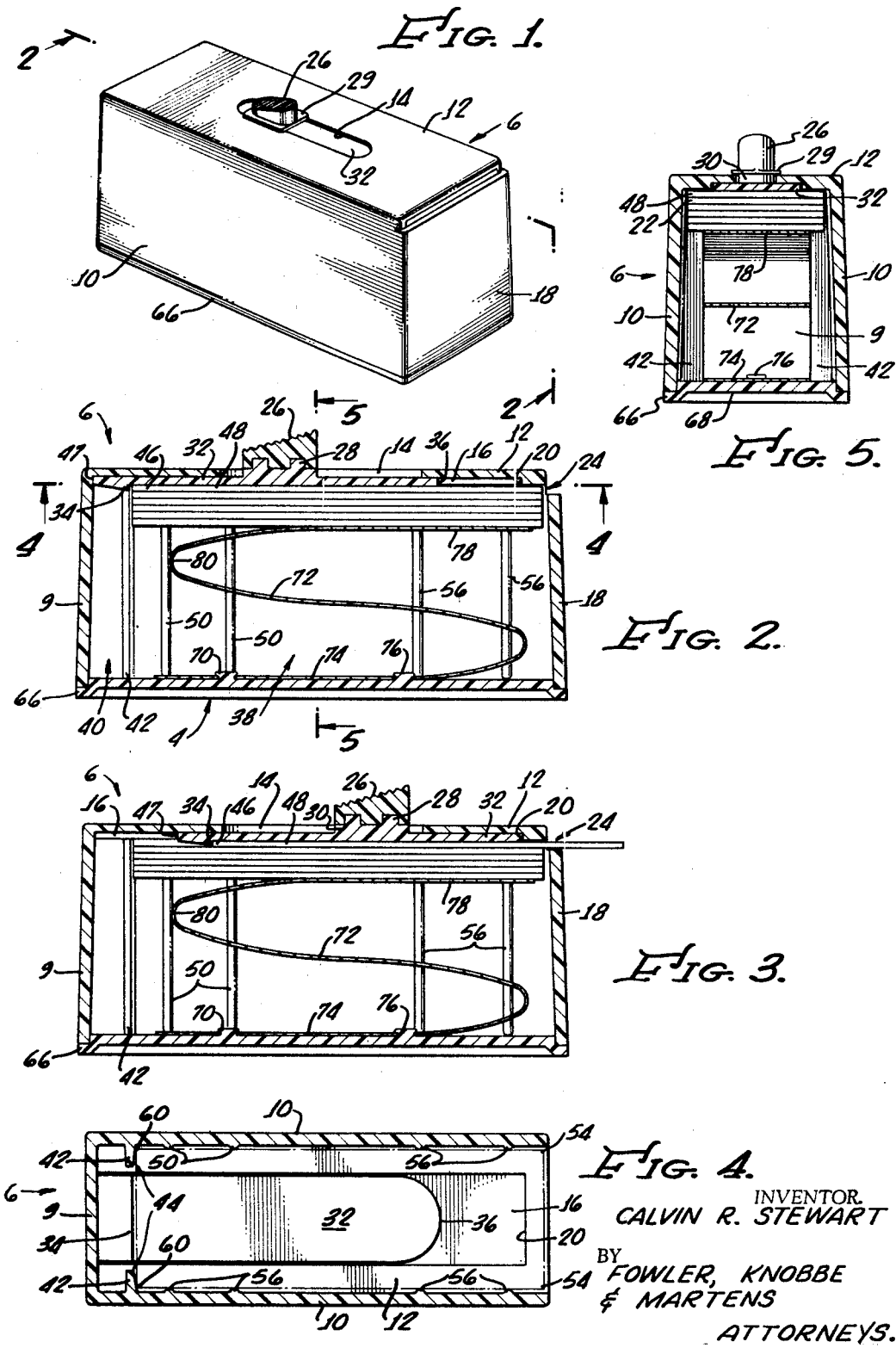

3,393,831
GLASS SLIDE DISPENSER
Calvin R. Stewart, Arcadia, Calif., assignor to
Scientific Plastic Corporation
Filed Nov. 25, 1966, Ser. No. 597,002
4 Claims. (Cl. 221—232)

ABSTRACT OF THE DISCLOSURE

A container having upwardly converging guide surfaces for guiding a stack of upwardly biased glass slides to a position centered with respect to a discharge slot near the top of one wall. A slide pusher mounted below a slot in the top partially ejects the slides through the discharge slot while maintaining the top slot closed during reciprocating feeding movement.

---

Rectangular glass slides are widely used in clinical applications in which a sample of body fluid is spread on the upper surface of the slide and the sample is then utilized to determine various specific quantitative or qualitative information about the fluid by chemical testing or by microscopic examination. It is imperative that the body fluid sample not be contaminated by any substance that can influence the specificity of the test.

In a typical hospital or private laboratory, the slides are stored in large containers and it is not uncommon that the container is simply left open for extended periods and the surface of the top slide becomes contaminated from airborne microrganisms. This is particularly undesirable in a hospital atmosphere where diverse pathogenic organisms may be in the atmosphere.

Furthermore, a technician often utilizes several slides for each patient or series of tests and removes a batch of slides from the container and places them on a table where they are further subjected to collection of airborne contamination. Moreover, in removing the series of slides from the open container, it is difficult to prevent the fingers or palm of the hand from touching the surfaces of the bottom or top slide and thereby depositing grease, dirt and contamination thereon.

During the removal of blood samples, the nurse or doctor usually holds the finger of the patient with one hand while he draws blood into a capillary tube with his other hand. He then transfers a drop of blood sample from the capillary tube to the top surface of several slides and then picks up several more blank slides and spreads the drop over each specimen slide and then covers each specimen slide with a blank slide as a sandwich. However, microscope slides are not easily handled. The glass surfaces between two slides have a tendency to stick together and a single slide is relatively thin and difficult to pick up by grasping it along its side edges. In the rush of the moment, in the presence of an uneasy patient and handling several difficult to handle slides, it is very easy to contaminate, drop or ruin a set of slides.

The present invention is directed to overcoming those difficulties by providing a dispenser that houses a plurality of microscope glass slides effectively sealed from contamination by airborne organisms and which on actuation partially ejects a single slide in the proper relationship for gripping along the front-most side edges leaving the other hand free to deposit a drop of body fluid on the antiseptic top surface thereof. The dispenser of the invention is manually held and is portable and therefore a technician simply takes one or several of the dispensers to the point of specimen removal or testing, rather than removing a large number of slides from an open container and allowing them to set exposed on a table top.

Furthermore, the dispenser of the invention has a very simple, functional shape which can be formed out of a plastic such as impact polystyrene which provides a low friction feeding and ejecting action for the dispenser, and the hand-held dispenser of the invention being so readily formed from a minimum amount of inexpensive plastic can be permanently sealed and disposed of when empty avoiding the time, expense and possibility of contamination on refilling the dispenser.

Further significant advantages relate to the trouble-free, jam-free and convenient operation of the dispenser. The dispenser is shaped to readily fit into the palm of the hand and the ejection actuator is mounted on the top to be conveniently moved by the thumb. The top mounted ejection actuator never uncovers the slides which are inside of the dispenser to the atmosphere during ejection and return strokes. Furthermore, the spring feed and the slide container compartments are so designed to assure the continuous ejection of a single slide until the device is empty without jamming by the sharp corners or edges of the slides biting into the softer plastic dispenser walls.

The container dimensions, the ejector and the spring feeding mechanisms, further, are designed to provide for storing a maximum number of slides in the small hand-held dispenser.

These and other features and advantages of the invention will become apparent as the description proceeds.

The present invention quite satisfactorily stores a stack of slides substantially sealed from the atmosphere and conveniently permits continuous and trouble-free ejection of single slides in a proper edge-gripping position.

The dispenser according to the invention includes a substantially rigid container having a top, bottom, back, front and two side walls for enclosing a stack of glass slides. The container is closed except for a discharge slot defined in the upper portion of the front wall to permit passage of a single glass slide and elongate slot is defined in the top of the container.

Feed means are mounted for reciprocation on the under side of the top wall below said elongate slot and includes means for engaging the top one of the glass slides and partially ejecting it a fixed distance out of the discharge slot. The feed means are reciprocated by means extending through said elongate top slot and are further provided with means for closing said elongate top slot throughout the reciprocation thereof.

Means are provided for biasing the slides toward said top wall and the upward movement of said glass slides during filling the container or feeding of slides is facilitated by upwardly converging side guide surfaces for guiding the slides upwardly to a position centered with respect to the discharge slot.

A more thorough understanding of the invention may be obtained by a study of the following detailed description, taken in connection with the accompanying drawings in which:

FIG. 1 is a perspective view of a preferred embodiment of the microscopic glass slide dispenser constructed according to the invention;

FIG. 2 is a sectional view taken generally along the lines 2—2 of FIG. 1;

FIG. 3 is a sectional view similar to FIG. 1 illustrating a slide extended into the ejected dispensing position;

FIG. 4 is a sectional view taken generally along the lines 4—4 of FIG. 2; and

FIG. 5 is a sectional view taken generally along lines 5—5 of FIG. 2.

Referring now to FIGS. 1–5, the glass dispenser of the invention comprises a substantially rigid container 6 for storing a stack of horizontal rectangular glass slides 22.

The container 6 includes a top 12, a bottom 4 and two upwardly converging side walls 10, a back wall 9 and an upwardly converging front wall 18. The front wall 18 terminates a distance below the top 12 substantially equal to the thickness of a glass slide 22 to form a discharge slot 24.

The glass slide feeding and discharge means are associated with the top 12 which has an elongated slot 14 and an internal rectangular recess 16 terminating rearward of the front wall 18 to form a shoulder 20. A rectangular elongated pusher member 32 is mounted for reciprocation in the rectangular recess 16 and terminates at its back end in a glass slide engaging lug 34 having a downward projection not more than the thickness of a glass slide 22 and in the other end in a rounded portion 36. A shank 30 provided with two cylindrical studs 28 is attached to the pusher member 32 and extends through the slot 14. Corresponding cylindrical recesses on the bottom 29 of a thumb button 26 receive the studs 28 and effect attachment of the button to the pusher member. The bottom of the thumb button is provided with a plate 29 wider than the slot to limit downward movement of the thumb button and prevent the slide member from becoming unseated.

On forward movement of the button 26 and the rectangular pusher 32, the lug 34 engages the back edge 46 of topmost glass slide 48. The pusher member 32 moves forward until the rounded end 36 abuts the shoulder 20 and concurrently the glass slide 48 is partially moved out of the discharge slot 48. On return of the button 26, the rear end 47 of the pusher engages the back wall 9 to limit the backward travel of the pusher.

The interior of the container is divided into a glass slide container compartment 38 and a back compartment 40 by means of oppositely disposed partial partitions 42 extending inward from the side walls 10. The forward surface 44 of each partial partition facing the container compartment 38 is tapered rearwardly from the side wall 10 to the inner edge of the partition 42, so that the corner of the glass slide only has point contact with the tapered surface 44. The partial partitions 42 are spaced forward from back wall a distance about equal to or slightly greater than the length of the slide engaging lug and the partial partitions 42 each terminate adjacent the rectangular recess 16. Thus the slide engaging lug can return behind the partitions 42 into the back compartment 40 and be in position to engage the back edge 46 of the topmost slide 48.

Means for guiding the stack of slides upwardly to a position centered with respect to the discharge slot are provided in the slide container compartment which contains an upwardly converging guide surface definable by a plurality of upwardly converging positioning ridges of semi-circular cross-sectional configuration. Eight of such ridges are illustrated, four ridges 50 being oppositely disposed on said side walls 10 near said partitions 42 and four ridges 56 being oppositely disposed on said side walls near the front corners 54 forming a converging passageway for said stack of slides.

The means for biasing the stack of slides toward said top and front of the container are disposed in the container below said stack of slides. As illustrated, cylindrical posts 70 mounted on the interior plate 68 of the bottom 4 extend through corresponding apertures in the base 74 of a Z-shaped single leaf spring 72 and attachment of said spring is effected by the flattened head portion 76 of said posts. The top leaf 78 of said spring is substantially horizontal and has its free end toward the front wall 18. The interior plate 68 is connected to the container by means of an outer exterior rectangular base member 66.

Referring again to the glass slide feeding and discharge assembly, the fixed distance projection of the glass slide from the dispenser is controlled by the distance of travel of the pusher member 32 or the difference in length between the rectangular pusher member 32 and its track or rectangular recess 76. Usually this will be about one-half inch. To maintain the elongated slot 14 closed during reciprocation of the pusher 32 member, the elongate slot 14 is at least the length of the fixed distance and is disposed back from the front wall 18 a distance at least as great as the fixed distance and forward of the back wall 9 a distance at least as great as the fixed distance. The pusher 32 is at least the combined length of the elongate slot 14 and the fixed distance. The shank 30 is positioned on the pusher 32 behind the rounded end 36 a distance greater than the fixed distance so as not to limit the forward travel of the pusher 32.

It is apparent that the length of travel or ejection projection cannot be much more than one-third of the length of a glass slide without substantially increasing the length of the engaging lug and back compartment to provide sufficient length to the rectangular pusher so as to maintain said slot covered during the forward travel of the pusher.

With respect to the continuous, jam-free feeding and dispensing of glass slides by the dispenser of the invention, the topmost glass slide 48 is prevented from binding into back corners 60 formed between the partial partitions 42 and the side walls 10 since the converging ridges 50 and 56 centrally position the glass slide away from the corners of the container and the corners of the glass slide only have a light point contact with the tapered surfaces 44 of the partitions 42. It is apparent that there are no front corners for the topmost slide 48 to engage since it will face the discharge slot 24. The plurality of succeeding glass slides 22 are also centrally positioned by point contact with the converging ridges 50 and 56 and also do not engage or bind into the corners or container walls. It has been found that the dispenser performs more consistently and effectively when at least four positioning ridges are provided on each side wall than it does when either two or three ridges are provided.

The dispenser is further intended not to permit jamming with the front wall and back partition during the forward ejection and backward return strokes of the slide members. The cooperation of a suitable spring and the lug and pusher member serves this purpose.

The shape and positioning of the spring member is important to the successful continuous jam-free operation of the dispenser. The spring should provide continuous, substantially parallel positioning of the stack of glass slides. There should not be a tendency to move the slides transversely nor to move them backwards. Furthermore, after the ejection of a slide the engaging lug is disposed toward the middle of the next glass slide and presents a pivot over which a pressure on the back end of the glass slides would cock them downward so that the forward end of the top slide would be below the narrow discharge slot and jam the dispenser. Therefore, the force of the spring must always be distributed so as to be slightly greater along the forward bottom length of the glass slides so that as a slide is pulled out of the dispenser, the next glass slide is pressed flat against the forward inner top of the dipenser. For example, applicant has found that if the spring illustrated is reversed, the dispenser will not operate.

As the Z-shaped single leaf spring illustrated relaxes from a compressed position, the top leaf 78 has a tendency to move forward and urge the stack of glass slides toward the front wall 18 and away from the back partial partitions 42. The return of the lug 34 temporarily moves the slides away from the front wall 18 to prevent jamming of the stack with said wall. On entry of the lug into the back compartment and on release of the thumb button, the stack of slides will again be urged toward the discharge slot.

The leaf spring is advantageously formed from spring steel but may also be formed out of a resilient plastic such as the formaldehyde resin known as "Delrin."

The five-sided container comprising the top 12 with slot 14 and recess 16, the sidewalls 10 and the back 9 and front walls 18 with integral discharge slot 24, two partial partitions 42 and eight diverging positioning ridges 50 and 56 can be formed in a single molding operation as a unitary member. The mating bottom 4 with raised spring receiving posts 70 can also be a unitarily formed piece. When the dispenser is to be permanently sealed and disposable, it is advantageous to form the container out of a thermoplastic, fusion sealable resin such as polystyrene so that the container and bottom can be simply formed and then attached by fusion bonding.

If it is further advantageous to form the feeding and discharge assembly, that is the rectangular pusher 32 with shank 30 and upstanding studs 28 and the button 26 with cylindrical recesses of the same plastic but of a higher melting and harder thermoplastic resin than that of the container. Suitable plastics are the polyolefins such as polyethylene or polypropylene. Then when the dispenser is finally assembled, filled and the bottom is sealed to the container by fusion such as by ultrasonic welding, the pusher and button are not effected. Since the polyolefin plastics are harder, the pusher will work more efficiently than it would if it was of a softer plastic such as is used for the top of the container.

It is apparent that the manufacture of the dispenser of the invention is simple, efficient and sufficiently inexpensive to make possible production of a throw-away device. The five-sided upper container portion is first formed. The pusher member 32 is positioned in the recess with the shank in the top slot and the thumb button is then placed over the cylindrical connectors. The dispenser is then filled with a plurality of slides, e.g., 20–30, preferably 24 and the bottom 4 with attached spring 72 facing forward is permanently attached to the container by ultrasonic welding. The converging guided surfaces provided by the side ridges 50 and 56 and front wall 18 also advantageously permits much easier filling of the dispenser.

The attractive and compact dispenser can be readily carried in the pocket of a technician or be placed in accessible positions open to the atmosphere with no danger of contaminating the specimen receiving surfaces of the slides, only the front edge of the top slide being exposed. When a slide is needed, the technician or doctor simply holds the dispenser in either hand and propels a slide partially out of the discharge slot into the proper edge gripping position. The specimen can be applied to the partially ejected slide or the slide can be first removed from the dispenser, the dispenser put down and the other hand left free to complete any necessary final manipulation of the slide.

The overall shaped and dimensions conveniently fit either hand of the user and the thumb button is presented comfortably under the center of the thumb. On actuation of the thumb button 26, the lug 34 is pressed slightly downward and moves out of the back compartment and engages the back edge 46 of a glass slide 48 and travels forward until the hemispherical end of the rectangular pusher abuts the shoulder 20 which is the end of the recess. This provides about one-half inch projection of the glass slide.

At this time, the leaf spring is forcing the front end of the row of slides tightly against the inner face of the top. The thumb actuator button is then pressed backwards and the lug slides across the top of the succeeding slides and travels behind the edge of the partial partitions and allows the slide to fully seat in flat relation to the top. The converging guiding provided by the sides and by the front and the point contact with the ridges on the side and the partitions allows the slides to feed upwardly without binding or jamming of the device at any time and centers the topmost slide with respect to the discharge slot. The slides are continuously dispensed each time they are needed and when the device is empty, it can simply be discarded. During use and non-use of the dispenser, there is no opportunity for contamination of the aseptic-housed slides, since only the narrow exit slot is open to the atmosphere and even then, only the front edge of the slide is exposed and not the top specimen receiving surface.

It is to be understood that the foregoing disclosure relates only to a preferred embodiment of the invention and that various modifications and alternatives are possible without departing from the scope of the invention as set forth in the following claims.

I claim:

1. A dispenser for rectangular glass slides comprising:

a container having top, bottom, back, front and two side walls, said container being closed except for a discharge slot defined in the upper portion of the front wall to permit passage of a single glass slide and an elongate slot defined in the top wall;

oppositely disposed partial partitions extending inward from the side walls dividing the container into a back compartment and a front compartment for enclosing a stack of glass slides;

a single leaf spring mounted on the bottom of the container having an elongate flat top leaf with its free end toward the front end wall engaging the bottom of the stack of slides for biasing the slides upwardly toward the top wall and toward the front wall;

an elongate pusher mounted for reciprocation between the partial partitions on the underside of the top wall and below the elongate slot including a rear downwardly depending lug for moving from the back compartment into the front compartment and engaging the back edge of the top one of the glass slides and for partially ejecting it a fixed distance out of said discharge slot, said slot being at least the length of said fixed distance and being disposed back from the distance greater than the fixed distance and forward of the back wall a distance at least as great as the fixed distance, and said pusher being at least the combined length of the elongate slot and the fixed distance;

a shank on said pusher extending through said elongate top slot and being connected to a botton for reciprocating the elongate pusher; and said front compartment, side walls including a plurality of spaced, upwardly converging, guide ridges extending from the top wall to below the glass slide enclosing surface for centrally guiding the slides upwardly to a position centered with respect to the discharge slot.

2. A dispenser according to claim 1 wherein the forward surface of each partial partition is tapered rearwardly.

3. A dispenser according to claim 1 wherein said fixed distance is less than about one-third the length of a glass slide.

4. A dispenser according to claim 1 having four guide ridges provided on each side wall.

References Cited

UNITED STATES PATENTS

| | | | |
|---|---|---|---|
| 807,402 | 12/1905 | Scanlan | 221—226 |
| 909,110 | 1/1909 | O'Neil | 221—232 |
| 1,198,394 | 9/1916 | Lilly | 221—232 |
| 1,697,366 | 1/1929 | Opfergeit | 221—232 |
| 2,431,523 | 11/1947 | Tuerff et al. | 221—232 X |
| 2,587,380 | 2/1952 | Polynice | 221—232 |
| 2,591,855 | 4/1952 | Nicholson | 221—232 |
| 2,653,704 | 9/1953 | Nelson | 221—232 |

WALTER SOBIN, *Primary Examiner.*